United States Patent [19]

Brownscombe

[11] 4,456,698

[45] Jun. 26, 1984

[54] RAPID CURING EPOXY COMPOSITIONS

[75] Inventor: Thomas F. Brownscombe, Houston, Tex.

[73] Assignee: Shell Oil Company, Houston, Tex.

[21] Appl. No.: 480,183

[22] Filed: Mar. 28, 1983

Related U.S. Application Data

[62] Division of Ser. No. 330,412, Dec. 14, 1981, Pat. No. 4,396,754.

[51] Int. Cl.³ .................... B01J 21/02; B01J 27/02; B01J 27/06
[52] U.S. Cl. .................... 502/203; 502/152; 502/172; 502/202; 502/224
[58] Field of Search .................. 252/429 R, 433, 434, 252/435

[56] References Cited

U.S. PATENT DOCUMENTS

| | | | |
|---|---|---|---|
| 2,633,458 | 3/1953 | Shokal | 260/45.2 |
| 2,658,885 | 11/1953 | D'Alelio | 260/53 |
| 3,017,387 | 1/1962 | Schwarger et al. | 528/93 X |
| 3,018,262 | 1/1962 | Schroede | 528/91 X |
| 3,242,104 | 3/1966 | Brueschweiler et al. | 528/98 X |
| 3,336,241 | 8/1967 | Shokal | 260/2 |
| 3,373,221 | 3/1968 | May | 260/837 |
| 3,432,440 | 3/1969 | Shimp et al. | 528/104 X |
| 4,130,511 | 12/1978 | Andrews | 528/92 |

*Primary Examiner*—Delbert E. Gantz
*Assistant Examiner*—William G. Wright
*Attorney, Agent, or Firm*—Norris E. Faringer

[57] ABSTRACT

The present invention provides a curable composition comprising (1) at least one epoxy compound containing at least one vicinal-epoxy group and (2) at least one catalyst selected from lithium or Group II metal salts of a non-nucleophilic acid. The present invention further provides an active epoxy curing catalyst composition.

10 Claims, No Drawings

RAPID CURING EPOXY COMPOSITIONS

This is a division of application Ser. No. 330,412, filed Dec. 14, 1981, now U.S. Pat. No. 4,396,754, issued Aug. 2, 1983.

BACKGROUND OF THE INVENTION

Epoxy compositions and their curing techniques are well-known and the patents issued on curable epoxy compositions number in the hundreds. Known curing agents include, among many others, polycarboxylic acids and anhydrides, amines, polyamides, imidazoles, and the like. Representative curing agents are described in U.S. Pat. No. 3,336,241. These curing agents may be employed with one or more catalysts or accelerators such as the stannous salts of monocarboxylic acids.

It will be appreciated that each and every one of the known epoxy-curing systems exhibits advantages over other systems, and, as importantly, disadvantages over the same systems. There is, of course, a continuing need to develop better epoxy curing compositions.

An epoxy curing system has now been found which is not only simple and produces rapid curing, but the resulting cured epoxy compositions exhibit excellent physical properties.

Accordingly, the present invention provides a curable epoxy composition comprising (1) an epoxy resin and (2) a curing amount of at least one "hard cation" catalyst.

SUMMARY OF THE INVENTION

The present invention provides a curable composition comprising (1) at least one epoxy compound containing at least one vicinal-epoxy group and (2) at least catalyst selected from the group consisting of lithium and Group II metal salts of a non-nucleophilic acid. The present invention further provides an active epoxy curing catalyst composition.

DESCRIPTION OF THE PREFERRED EMBODIMENT

Suitable polyepoxides useful in the present compositions comprise those compounds containing at least one vicinal epoxy or oxirane goup, i.e., at least one

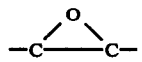

group. These polyepoxides may be saturated or unsaturated, aliphatic, cycloaliphatic, aromatic or heterocyclic and may be substituted if desired with non-interfering substitutents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,373,221 and U.S. Pat. No. 3,377,406 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

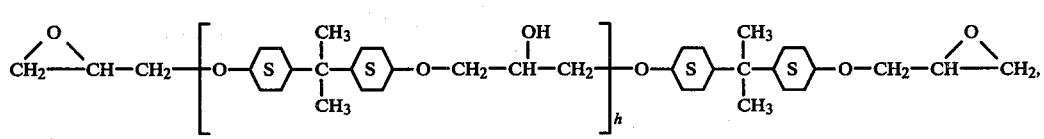

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., the phenol-aldehyde condensates, as described in U.S. Pat. No. 2,658,885.

CATALYSTS

The hard cation non-nucleophilic anion catalysts useful in the present composition include lithium and Group II metal salts of a non-nucleophilic acid. A "non-nucleophilic" acid is defined herein to mean that (1) a 10% by weight water solution has a pH of <1.0 and (2) the anion portion of the acid does not easily participate in displacement reaction with organic halides.

The preferred Group II metal (alkaline earth metal) salts are calcium and magnesium.

Suitable non-nucleophilic acids include fluoboric, fluoarsenic, fluoantimonic and fluophosphoric acids.

Accordingly, suitable hard cation non-nucleophilic anion salts include, $LiBF_4$, $Ca(BF_4)_2$, $Mg(BF_4)_2$, $LiPF_6$, $Ca(PF_6)_2$, $Mg(PF_6)_2$, $LiSbF_6$, $LiAsF_6$ and the like.

Very preferred hard cation non-nucleophilic anion catalysts are $LiBF_4$ and $Ca(BF_4)_2$.

The amount of catalyst (curing agent) utilized will be a curing or hardening amount. In general, from about 0.05 to about 15 parts per one hundred parts by weight (phr) of polyepoxides is employed with from about 0.1 to about 10.0 phr being preferred, and from about 0.5 phr to about 2.0 phr being especially preferred.

The present compositions may be prepared by various techniques. If, for example, the instant compositions are to be utilized within a short time, they can be simply prepared by mixing all the components, then adding one or more of the customary additives such as solvents; fillers; reinforcement fibers; mats and bars; pigments; flame retardant agents; antioxidants; plasticizers; stabilizers; extenders; thixotropic agents; etc., and then molding and curing the resulting composition. Even more effective curing (hardening) can be achieved when the metal salt is applied to a finely divided inorganic carrier. Simply, the metal salt is suspended in a solvent to which one or more inorganic materials have been added. After blending the components (salt/solvent/inorganic material) the solvent is removed via distillation. The resulting catalyst composition can be used to effectively cure epoxy resins.

Operable solvents include water and the oxy-containing solvents such as the alcohols, glycols and glycol ethers as well as the ketones and other organic solvents. Suitable solvents include tetrahydrofuran (THF), acetone, methyl ethyl ketone (MEK), methyl isobutyl ketone (MIBK), pyran, propylene carbonate, cyclohexanone, acetophenone, diethyl ether, ethylene glycol, OXITOL®, CELLOSOLVE® and CELLOSOLVE® Acetate, morpholine, ethyl alcohol, dimethylsulfoxide (DMSO), dimethylformamide (DMF) and the like.

Suitable inorganic materials include silica gel, alumina, CABOSIL®, mica, clays, talcs, glasses, asbestos, gypsum, anhydrous $CaSO_4$, titanium dioxide ($TiO_2$) and the like.

The following examples are given to illustrate the present heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis-(4-hydroxyphenyl)propane having an epoxide equivalent (WPE) of 175-190 and an average molecular weight of about 350.

Epoxy Resin B is a solid glycidyl polyether of 2,2-bis(4-hydroxyphenyl)propane having a WPE of about 500 and an average molecular weight of about 900.

EXAMPLE I

Into a 500 ml beaker were placed 150 grams of Polyether A, a solution of 1.5 g OXITOL® and 0.75 of $LiBF_4$. The mixture was stirred until homogenous and poured into a "HDT" mold to produce test specimens of ½"×½"×5" and a "plate" mold 4"×8"×⅛". The material was set aside at ambient temperature for 1 hour (exotherm observed) and then cured at 70° C. for 7 hours and post cured at 120° C. for 2 hours. The cured composition had the following physical properties:

| HDT | 75° C. |
|---|---|
| Extension @ Break | 2.3% |
| tensile stress at break, psi | 7000 |
| Young's modulus, psi | 510,000 |
| Izod, ft-lbs/in notch | 0.3 |
| Retention of shear modulus at 70° C.; percentage of ambient temperature shear modulus retained at 70° C. in a torsion test | 51% |

EXAMPLE II

Into a 25 ml polypropylene beaker were placed 10 grams of Polyether A and a solution containing 0.1 grams $LiBF_4$ and 0.1 gram of water. The mixture was stirred rapidly and 2 grams of this mixture were placed in a vial immersed in an oil bath at 150° C. The mixture exothermed to 236° C. in 66 seconds and upon being removed from the bath was a solid cured mass.

EXAMPLE III

The procedure of Example II was essentially repeated wherein $NaBF_4$, $KBF_4$, $NH_4BF_4$ and $NH_4PF_6$ were each used in lieu of $LiBF_4$ and OXITOL® was substituted for water. After heating at 100° C. to 150° C. for periods exceeding 1 day, no appreciable gel was observed, thus indicating clearly the general ineffectiveness of the Na, K and $NH_4$ salts of fluoboric acid in a water solvent.

EXAMPLE IV 10 grams of Polyether A were mixed with a solution containing 0.1 gram $Ca(BF_4)_2$ and 0.2 g OXITOL®. After rapid mixing by hand, the mass cured and solidified within 20 seconds after the initial contact at room temperature.

EXAMPLE V

The procedure of Example IV was essentially repeated using the following compositions:

|  | Parts by Weight |
|---|---|
| Composition A | |
| Polyether A | 10 |
| Mg(BF$_4$)$_2$ | 0.10 |
| Water | 0.23 |
| Composition B | |
| Polyether A | 10 |
| Ca(BF$_4$)$_2$ | 0.10 |
| OXITOL ® | 0.25 |

The compositions were stirred by hand, poured on a gel plate and spread with a doctor blade into an 10 mil film. The film from Compositon A cured hard in less than 30 minutes at room temperature and could be peeled from the plate. The film from Composition B cured in 1 hour and 15 minutes at room temperature. No significant exotherm was observed in these thin films, indicating truly ambient cure.

EXAMPLE VI

The procedure of Example IV was repeated wherein no solvent was employed. Similar results were obtained.

EXAMPLE VII

The procedure of Example IV was repeated wherein an equivalent amount of the following solvents were used: tetrahydrofuran, acetone, MIBK, MEK, acetophenone, cyclohexanone, diethyl ether, ethylene glycol and propylene carbonate. Similar results were obtained.

EXAMPLE VIII

The procedure of Example I was essentially repeated wherein 10 grams of Epoxy Resin B were ground, mixed with 0.1 gram of LiBF$_4$ (dried in vacuum) and placed on a 100° C. gel plate. The solid resin melted and gelled in 42 seconds and full hardness was exhibited 2 hours. The cured resin could not be melted again, thus proving it had cured. Neat Epoxy Resin B can be melted and remelted.

EXAMPLE IX

This example illustrates the preparation of a preferred metal catalyst (curing agent) powder. 1 gram of LiBF$_4$ was dissolved in 10 grams of OXITOL ®. Then, 1 gram of CABOSIL ® was added and stripped under vacuum for 4 hours at 40° C. 3.18 grams of white free-flowing powder were obtained.

One hundred parts by weight of Polyether A and of Polyether B could be effectively cured with 3 parts by weight of the above curing agent in less than 20 minutes at room temperature.

EXAMPLE X

The procedure of Example IX was essentially repeated wherein a catalyst was prepared by mixing 0.27 grams of Ca(BF$_4$)$_2$.4H$_2$O, 0.42 grams of OXITOL ® and 0.31 grams of CABOSIL ® (fumed silica). Then 0.1 grams of the resulting dry catalyst was mixed with 0.85 grams of Epoxy Resin A in a hole ½" deep and ¼" in diameter in the side of a 42 pound Portland concrete block by agitating a 3/16" eye bolt for thirty seconds. After 3 minutes, it was possible to lift the concrete block by the eye bolt.

EXAMPLE XI

The procedure of Example X was essentially repeated wherein mica, silica gel, talc, anhydrous CaSO$_4$, and Bentonite clay was used in lieu of CABOSIL ®. Essentially the same results were obtained except that more catalyst based on Bentonite clay was required to produce a good cure, i.e. ca 5 phr or more.

EXAMPLE XII

The example illustrates the effectiveness of the instant metal salts as curing agents for epoxy resins. The components were mixed together and the gel (cure) time was determined at preselected temperatures. The results of representative experiments are tabulated in Table I.

TABLE I

| Polyether | pbw | Curing Agent | pbw | Solvent/pbw | Gel Time &/Temp. |
|---|---|---|---|---|---|
| A | 100 | Ca(BF$_4$)$_2$ | 1 | OXITOL 2 | 20 sec./RT (1 hr 10 min in a film RT) |
| A | 80 | Ca(BF$_4$)$_2$ | 1 | OXITOL 20 | 18 sec/100° C. |
| A | 100 | LiPF$_6$ | 1 | OXITOL 2 | <2¼ min/RT |
| A | 100 | LiBF$_4$ | 1 | H$_2$O 1 | 66 sec/150° C. |
| A | 100 | Mg(BF$_4$)$_2$ | 1 | H$_2$O 2.3 | <30 min, RT-10 mil film |
| A | 100 | Ca(BF$_4$)$_2$ | 1 | Toluene 100 cyclohexanone 2 | 2¼ min, RT |
| A | 100 | Mg(BF$_4$)$_2$ | 1.2 | Toluene 100 cyclohexanone 2.2 | 1.3 min, RT |
| B | 100 | LiBF$_4$ | 1 | — | 0.7 min, 100° C. |

What is claimed is:

1. A catalyst composition suitable for the rapid curing of epoxy compositions prepared by blending (1) a lithium salt of a non-nucleophilic acid, (2) a solvent and (3) a finely divided inert inorganic material, and then, removing at least a portion of the solvent.

2. The composition of claim 1 wherein the solvent is water.

3. The composition of claim 1 wherein the solvent is an organic solvent.

4. The composition of claim 3 wherein the organic solvent is an oxygenated solvent.

5. The composition of claim 4 wherein the oxygenated solvent is a glycol ether.

6. The composition of claim 1 wherein the lithium salt is LiBF$_4$ or LiPF$_6$.

7. The composition of claim 1 wherein the inert inorganic material is fumed silica.

8. The composition of claim 1 wherein the inert inorganic material is sand.

9. The composition of claim 1 wherein the inert inorganic material is silica gel.

10. The composition of claim 1 wherein the inert inorganic material is mica.

* * * * *